(12) United States Patent
Ukai

(10) Patent No.: US 12,680,972 B2
(45) Date of Patent: Jul. 14, 2026

(54) X-RAY FLUORESCENCE SPECTROMETER AND POWER SUPPLY APPARATUS

(71) Applicant: SHIMADZU CORPORATION, Kyoto (JP)

(72) Inventor: Yohei Ukai, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 134 days.

(21) Appl. No.: 18/923,410

(22) Filed: Oct. 22, 2024

(65) Prior Publication Data

US 2025/0172514 A1 May 29, 2025

(30) Foreign Application Priority Data

Nov. 29, 2023 (JP) ................................. 2023-201305

(51) Int. Cl.
G01N 23/223 (2006.01)
H01F 30/06 (2006.01)
H05G 1/10 (2006.01)

(52) U.S. Cl.
CPC ........... *G01N 23/223* (2013.01); *H01F 30/06* (2013.01); *H05G 1/10* (2013.01)

(58) Field of Classification Search
CPC ......... G01N 23/223; H01F 30/06; H05G 1/10
See application file for complete search history.

(56) References Cited

FOREIGN PATENT DOCUMENTS

JP 2010212072 A * 9/2010
JP 2013187929 A * 9/2013

* cited by examiner

*Primary Examiner* — Casey Bryant
(74) *Attorney, Agent, or Firm* — Muir Patent Law, PLLC

(57) ABSTRACT

A power supply that applies a tube voltage to a target includes a transformer, a switching circuit connected to a primary side of the transformer, and a substrate to which the switching circuit and the transformer are connected, the substrate including a first layer and a second layer. The transformer includes a first primary winding and a second primary winding on the primary side. A first wiring pattern that connects the first primary winding and the switching circuit to each other is located in the first layer. A second wiring pattern that connects the second primary winding and the switching circuit to each other is located in the second layer. The first layer and the second layer are arranged such that at least a part of the first wiring pattern overlaps with the second wiring pattern when the substrate is viewed from a stacked direction in a plan view.

6 Claims, 9 Drawing Sheets

[FIRST EMBODIMENT]

[FIRST EMBODIMENT]

[FIRST EMBODIMENT]

FIG.6

[FIRST COMPARATIVE EXAMPLE]

[SECOND COMPARATIVE EXAMPLE]

[SECOND EMBODIMENT]

[SECOND EMBODIMENT]

X-RAY FLUORESCENCE SPECTROMETER AND POWER SUPPLY APPARATUS

CROSS REFERENCE TO RELATED APPLICATIONS

This nonprovisional application is based on Japanese Patent Application No. 2023-201305 filed with the Japan Patent Office on Nov. 29, 2023, the entire contents of which are hereby incorporated by reference.

BACKGROUND OF THE INVENTION

Field of the Invention

The present disclosure relates to an X-ray fluorescence spectrometer and a power supply apparatus.

Description of the Background Art

An X-ray generator has conventionally been used in a method of analysis of a sample by irradiation of the sample with X-rays. The X-ray generator generates X-rays by application of a high voltage called a tube voltage across a cathode electrode and a target electrode. The X-ray generator may include a converter as described in Japanese Patent Laying-Open No. 2013-187929 (Patent Literature 1) for boost of a voltage. For example, Japanese Patent Laying-Open No. 2010-212072 (Patent Literature 2) describes an X-ray generator that generates X-rays with a DC/DC converter.

SUMMARY OF THE INVENTION

In an example where a switching element such as a metal oxide semiconductor field effect transistor (MOSFET) is employed in the converter, a surge voltage may be produced when the switching element is controlled from an on state to an off state. When the surge voltage exceeds a rated voltage value of the switching element, the switching element may break. Though occurrence of a failure by the surge voltage can be suppressed by employing a switching element high in rated voltage value, cost will increase.

Magnitude of the produced surge voltage is varied depending on magnitude of a loop inductance in a round of a path including the switching element. For example, by reducing an inductance component between the switching element and a primary winding of a transformer in a power supply apparatus described in Patent Literature 1, the produced surge voltage lowers. In other words, a shorter length of wiring from the switching element to the primary winding can reduce magnitude of the produced surge voltage.

The switching element and the primary winding of the transformer, however, are both heat generating elements. A shorter physical distance between the switching element and the primary winding of the transformer leads to dense arrangement of heat generating elements and increase in temperature of the power supply apparatus.

The present disclosure was made to solve the problems described above, and an object thereof is to lower a turn-off surge voltage while a distance between a switching element and a primary winding of a transformer is maintained.

An X-ray fluorescence spectrometer according to one aspect of the present disclosure includes an X-ray tube including a filament and a target, the X-ray tube being configured to irradiate a sample with primary X-rays, a detector that detects secondary X-rays generated from the sample, and a power supply that applies a tube voltage to the target. The power supply includes a transformer, a switching circuit connected to a primary side of the transformer, and a substrate to which the switching circuit and the transformer are connected, the substrate including a first layer and a second layer. The transformer includes a first primary winding and a second primary winding on the primary side. A first wiring pattern that connects the first primary winding and the switching circuit to each other is located in the first layer. A second wiring pattern that connects the second primary winding and the switching circuit to each other is located in the second layer. The first layer and the second layer are arranged such that at least a part of the first wiring pattern overlaps with the second wiring pattern when the substrate is viewed from a stacked direction in a plan view.

A power supply apparatus according to one aspect of the present disclosure is a power supply apparatus that applies a tube voltage to a target arranged in an X-ray tube, and the power supply apparatus includes a transformer, a switching circuit connected to a primary side of the transformer, and a substrate to which the switching circuit and the transformer are connected, the substrate including a first layer and a second layer. The transformer includes a first primary winding and a second primary winding on the primary side. A first wiring pattern that connects the first primary winding and the switching circuit to each other is located in the first layer. A second wiring pattern that connects the second primary winding and the switching circuit to each other is located in the second layer. The first layer and the second layer are arranged such that at least a part of the first wiring pattern overlaps with the second wiring pattern when the substrate is viewed from a stacked direction in a plan view.

The foregoing and other objects, features, aspects and advantages of this invention will become more apparent from the following detailed description of this invention when taken in conjunction with the accompanying drawings.

BRIEF DESCRIPTION OF THE DRAWINGS

FIG. 6 is a plan view for illustrating a path in a first comparative example.

DESCRIPTION OF THE PREFERRED EMBODIMENTS

First Embodiment

Figure 1:
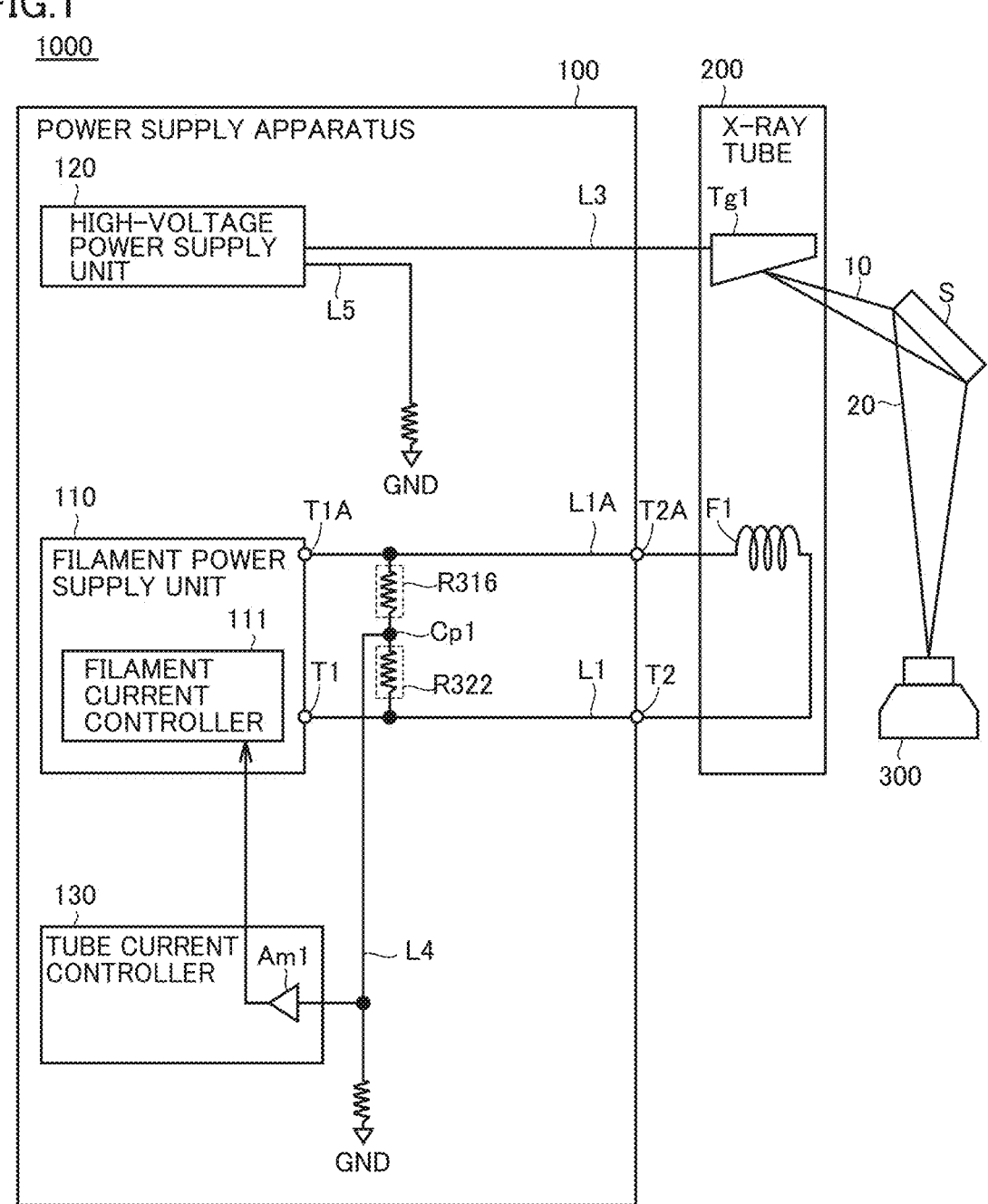
FIG. 1 is a diagram schematically showing a power supply apparatus and an X-ray tube included in an X-ray fluorescence spectrometer.

The present embodiment will be described in detail with reference to the drawings. The same or corresponding elements in the drawings have the same reference characters allotted and description thereof will not be repeated in principle.

<Configuration of Power Supply Apparatus and X-Ray Tube>

FIG. 1 is a diagram schematically showing a power supply apparatus 100 and an X-ray tube 200 included in an X-ray fluorescence spectrometer 1000. X-ray fluorescence spectrometer 1000 is, for example, an energy dispersive X-ray fluorescence spectrometer (EDX). In the present embodiment, an example in which power supply apparatus 100 that generates primary X-rays is applied to X-ray fluorescence spectrometer 1000 will be described.

As shown in FIG. 1, X-ray fluorescence spectrometer 1000 includes power supply apparatus 100, X-ray tube, 200, and a detector 300. Power supply apparatus 100 applies a voltage to X-ray tube 200 to excite primary X-rays 10. A sample S is irradiated with primary X-rays 10. Sample S irradiated with primary X-rays 10 emits X-ray fluorescence 20. X-ray fluorescence 20 emitted from sample S is referred to as "secondary X-rays" in relation to primary X-rays. Detector 300 detects X-ray fluorescence 20. X-ray fluorescence spectrometer 1000 can thus conduct quantitative analysis or qualitative analysis of sample S.

A target Tg1 and a filament F1 are arranged in the inside of X-ray tube 200. Target Tg1 is an anode and filament F1 is a cathode. In X-ray tube 200, target Tg1 and filament F1 are arranged at a distance from each other. Power supply apparatus 100 includes a filament power supply unit 110, a high-voltage power supply unit 120, and a tube current controller 130.

Filament power supply unit 110 supplies a current to filament F1 to heat filament F1. The current supplied to filament F1 by filament power supply unit 110 is referred to as a "filament current" below.

High-voltage power supply unit 120 applies a high voltage across target Tg1 and filament F1. The high voltage applied by high-voltage power supply unit 120 is referred to as a "tube voltage" below. High-voltage power supply unit 120 boosts with a rectifier, a converter, a Cockcroft-Walton circuit, or the like, a direct-current (DC) voltage converted from a commercial power supply by a switching power supply to generate the high voltage. High-voltage power supply unit 120 may correspond to the "power supply" in the present disclosure.

As shown in FIG. 1, high-voltage power supply unit 120 is connected to target Tg1 through a power line L3. In addition, high-voltage power supply unit 120 is connected to a ground terminal GND through a power line L5. In X-ray tube 200, thermions are generated by heating of filament F1 by filament power supply unit 110. Thermions impinge on target Tg1 by application of the tube voltage across filament F1 and target Tg1 by high-voltage power supply unit 120. Primary X-rays 10 are thus excited.

As shown in FIG. 1, filament power supply unit 110 is connected to filament F1 through a power line L1 and a power line L1A. Power line L1 is connected to one end of filament F1 and power line L1A is connected to the other end of filament F1. Filament power supply unit 110 has terminals T1 and T1A connected to power lines L1 and L1A, respectively. Power supply apparatus 100 has terminals T2 and T2A connected to filament F1.

A connection point Cp1 is a connection point between a connection point between terminal T1 and terminal T2 and a connection point between terminal T1A and terminal T2A. A resistor R322 is connected between connection point Cp1 and the connection point between terminal T1 and terminal T2. A resistor R316 is connected between connection point Cp1 and the connection point between terminal T1A and terminal T2A.

A power line L4 has one end connected to connection point Cp1 and has the other end connected to a ground terminal GND with a resistor being interposed. Power line L4 may have one end connected to any one of the connection point between terminal T1 and terminal T2 and the connection point between terminal T1A and terminal T2A, rather than connection point Cp1.

Tube current controller 130 carries out feedback control to adjust output from filament power supply unit 110 based on a current value of the current that flows through power line L4. More specifically, tube current controller 130 detects a value of the tube current that flows through power line L4 by converting with the resistor, the tube current that flows through power line L4 into a voltage value and amplifying the voltage value with an amplifier Am1. Tube current controller 130 transmits the value of the detected tube current to a filament current controller 111. Filament power supply unit 110 adjusts the filament current to be outputted, based on the value of the tube current detected by tube current controller 130.

In X-ray fluorescence spectrometer 1000 in the present embodiment, the voltage is boosted by a boost DCDC converter in high-voltage power supply unit 120. An internal configuration of a boost DCDC converter 500 included in high-voltage power supply unit 120 will be described below with reference to FIG. 2.

Figure 2:
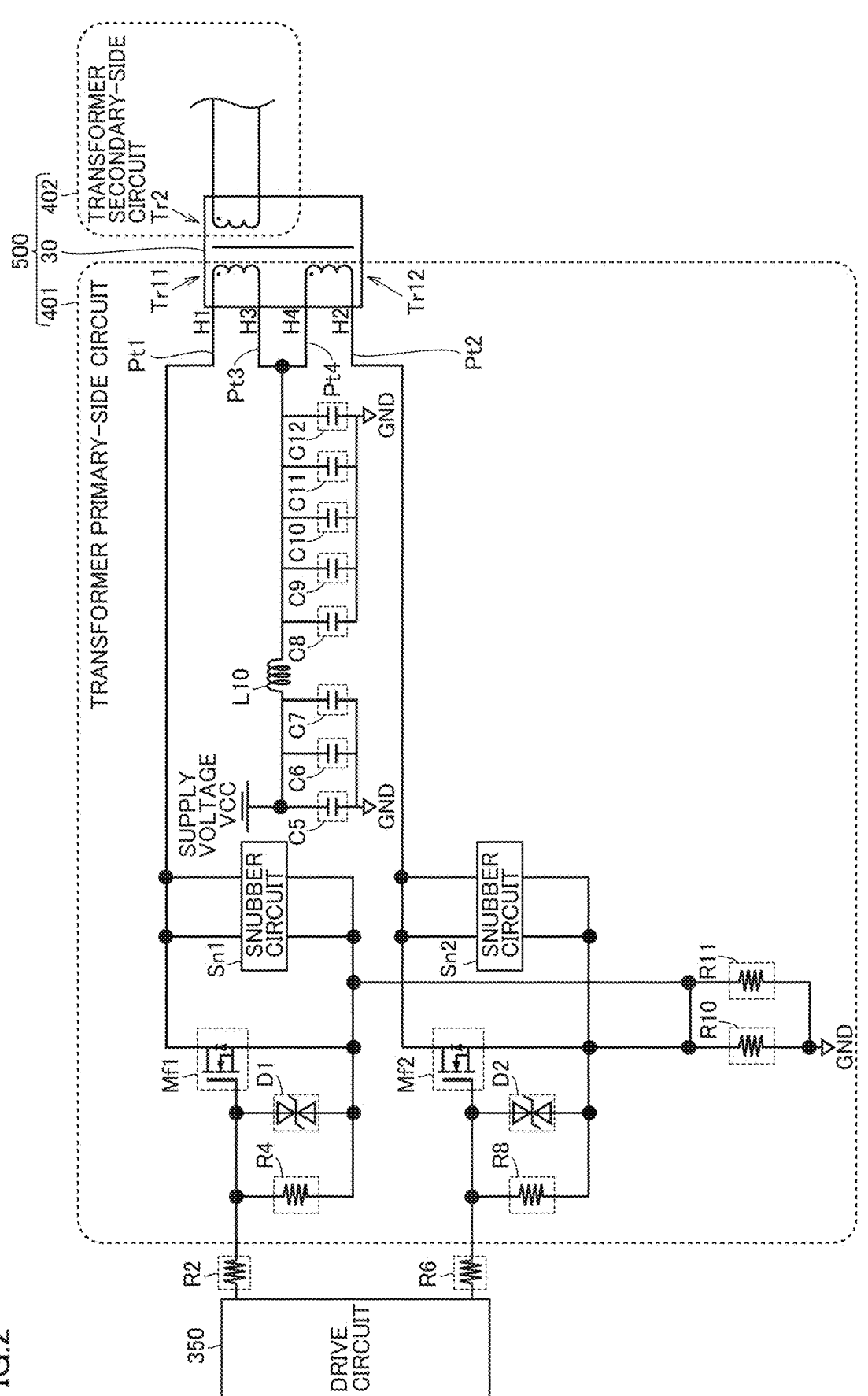
FIG. 2 is a diagram for illustrating an internal configuration of a boost DCDC converter arranged in a high-voltage power supply unit in a first embodiment.

FIG. 2 is a diagram for illustrating the internal configuration of boost DCDC converter 500 included in high-voltage power supply unit 120 in the first embodiment. DCDC converter 500 in the first embodiment is a DCDC converter, and more specifically a push-pull converter.

As shown in FIG. 2, DCDC converter 500 includes a transformer primary-side circuit 401, a transformer secondary-side circuit 402, and a transformer 30. Transformer 30 includes primary windings Tr11 and Tr12 included in transformer primary-side circuit 401 and a secondary winding Tr2 included in transformer secondary-side circuit 402. Transformer 30 may correspond to the "transformer" in the present disclosure. Primary winding Tr11 may correspond to the "first primary winding" in the present disclosure. Furthermore, primary winding Tr12 may correspond to the "second primary winding" in the present disclosure.

DCDC converter 500 boosts a DC voltage of 24 V applied from a supply voltage VCC as switching elements Mf1 and Mf2 are driven. The DC voltage applied from supply voltage VCC is generated by rectification or the like of the commercial power supply. The DC voltage applied from supply voltage VCC may be a voltage other than 24 V. The voltage boosted by DCDC converter 500 is further boosted to an output voltage from high-voltage power supply unit 120 by the Cockcroft-Walton circuit or the like. The output voltage from high-voltage power supply unit 120 is, for example, 60 kV.

As shown in FIG. 2, primary winding Tr11 is provided with an end H1 and an end H3. In transformer primary-side circuit 401, primary winding Tr11 has end H3 connected to a path Pt3. Path Pt3 is a path between an inductor L10 and end H3. Primary winding Tr11 has end H1 connected to a path Pt1. Path Pt1 is a path between end H1 and a drain terminal of switching element Mf1.

Primary winding Tr12 is provided with an end H2 and an end H4. Primary winding Tr12 has end H4 connected to a path Pt4. Path Pt4 is a path between inductor L10 and end H4. Primary winding Tr12 has end H2 connected to a path Pt2. Path Pt2 is a path between end H2 and a drain terminal of switching element Mf2.

Inductor L10 has opposing ends connected to ground terminals GND with a plurality of capacitors being interposed. Specifically, capacitors C5, C6, and C7 are connected in parallel between one end of inductor L10 and ground terminal GND. Capacitors C8 to C12 are connected in parallel between the other end of inductor L10 and ground terminal GND. Capacitors C5 to C12 function as bypass capacitors that remove an alternating-current (AC) component.

Primary winding Tr11 has end H3 connected to supply voltage VCC through path Pt3 and inductor L10. On the other hand, primary winding Tr11 has end H1 connected to the drain terminal of switching element Mf1 through path Pt1. In the first embodiment, switching element Mf1 is, for example, a MOSFET, which is an element that switches supply of the current to primary winding Tr11. A snubber circuit Sn1 is connected between the drain terminal of switching element Mf1 and a source terminal of switching element Mf1. Snubber circuit Sn1 is a protection circuit that suppresses a transient high voltage generated at the time of disconnection of a switch in switching element Mf1.

Switching element Mf1 has a gate terminal connected to a drive circuit 350 with a resistor R2 being interposed. Drive circuit 350 controls switching element Mf1 under pulse width modulation (PWM) control. A resistor R4 and a bidirectional Zener diode D1 are connected in parallel between the gate terminal of switching element Mf1 and the source terminal of switching element Mf1. Bidirectional Zener diode D1 is provided to protect switching element Mf1 at the time of production of an overvoltage at the gate terminal of switching element Mf1.

A circuit connected to primary winding Tr12 will also similarly be described. Primary winding Tr12 has end H4 connected to supply voltage VCC through path Pt4 and inductor L10. On the other hand, primary winding Tr12 has end H2 connected to switching element Mf2 through path Pt2. Likewise switching element Mf1, switching element Mf2 is, for example, a MOSFET, which is an element for switching of supply of the current to primary winding Tr12.

A snubber circuit Sn2 is connected between the drain terminal of switching element Mf2 and a source terminal of switching element Mf2. Snubber circuit Sn2 is a protection circuit that suppresses a transient high voltage generated at the time of disconnection of a switch in switching element Mf2. In one aspect, switching elements Mf1 and Mf2 may each be an insulated gate bipolar transistor (IGBT) rather than the MOSFET. Switching element Mf1 may correspond to the "first switching element" in the present disclosure. Switching element Mf2 may correspond to the "second switching element" in the present disclosure. Furthermore, both of switching element Mf1 and switching element Mf2 may correspond to the "switching circuit" in the present disclosure. Snubber circuit Sn1 may correspond to the "first snubber circuit" in the present disclosure. Snubber circuit Sn2 may correspond to the "second snubber circuit" in the present disclosure.

Switching element Mf2 has a gate terminal connected to drive circuit 350 with a resistor R6 being interposed. Drive circuit 350 controls switching element Mf2 under PWM control. A resistor R8 and a bidirectional Zener diode D2 are connected in parallel between the gate terminal of switching element Mf2 and the source terminal of switching element Mf2. Bidirectional Zener diode D2 is provided to protect switching element Mf2 at the time of production of an overvoltage at the gate terminal of switching element Mf2.

Drive circuit 350 has an on state and an off state of switching element Mf1 repeated and has the on state and the off state of switching element Mf2 repeated to alternately supply the current to primary winding Tr11 and primary winding Tr12. Drive circuit 350 controls switching elements Mf1 and Mf2 so as to prevent switching elements Mf1 and Mf2 from being simultaneously set to the on state.

As shown in FIG. 2, switching elements Mf1 and Mf2 have the source terminals connected to one ends of resistors R11 and R10, respectively. Resistor R10 has the other end connected to ground terminal GND. Similarly, resistor R11 has the other end connected to ground terminal GND.

High-voltage power supply unit 120 in the present embodiment thus includes DCDC converter 500 that repeatedly drives switching elements Mf1 and Mf2 to boost the voltage. In the present embodiment, the surge voltage may be produced at the time of switching of switching elements Mf1 and Mf2 from the on state to the off state. This surge voltage is referred to as a "turn-off surge voltage" below.

A cause of production of the turn-off surge voltage is excessive charging of a parasitic capacitance of a switching element under the influence by a loop inductance in a round of path including the switching element. When the turn-off surge voltage exceeds rated voltage values of switching elements Mf1 and Mf2, switching elements Mf1 and Mf2 may fail.

By reducing a leakage inductance between primary windings Tr11 and Tr12, an inductance component between switching element Mf1 and primary winding Tr11 is reduced and the turn-off surge voltage produced in switching element Mf1 is lowered. By reducing a length of path Pt1, the inductance component is reduced. The shorter length of path Pt1, however, leads to a shorter physical distance between switching element Mf1 and primary winding Tr11 which are heat generating element and dense arrangement of the heat generating elements. Similarly, the shorter length of path Pt2 can achieve reduction in magnitude of the turn-off surge voltage produced in switching element Mf2, whereas it leads to the shorter physical distance between switching element Mf2 and primary winding Tr12 which are heat generating elements and dense arrangement of the heat generating elements.

Then, in high-voltage power supply unit 120 in the present embodiment, path Pt1 and path Pt2 are mounted as wiring patterns in a printed board. In the present embodiment, by adoption of a parallel plate structure in which a printed board Sb1 is used to arrange path Pt1 and path Pt2 in a plate structure in parallel, a degree of coupling between primary winding Tr11 and primary winding Tr12 is improved to reduce the leakage inductance between primary windings Tr11 and Tr12. With reduction in leakage inductance between primary windings Tr11 and Tr12, while the shorter distance between switching element Mf1 and primary windings Tr11 and Tr12 is suppressed, increase in magnitude of the produced turn-off surge voltage can also simultaneously be suppressed. Path Pt1 may correspond to the "first wiring pattern" in the present disclosure. Path Pt2 may correspond to the "second wiring pattern" in the present disclosure.

Figure 3:
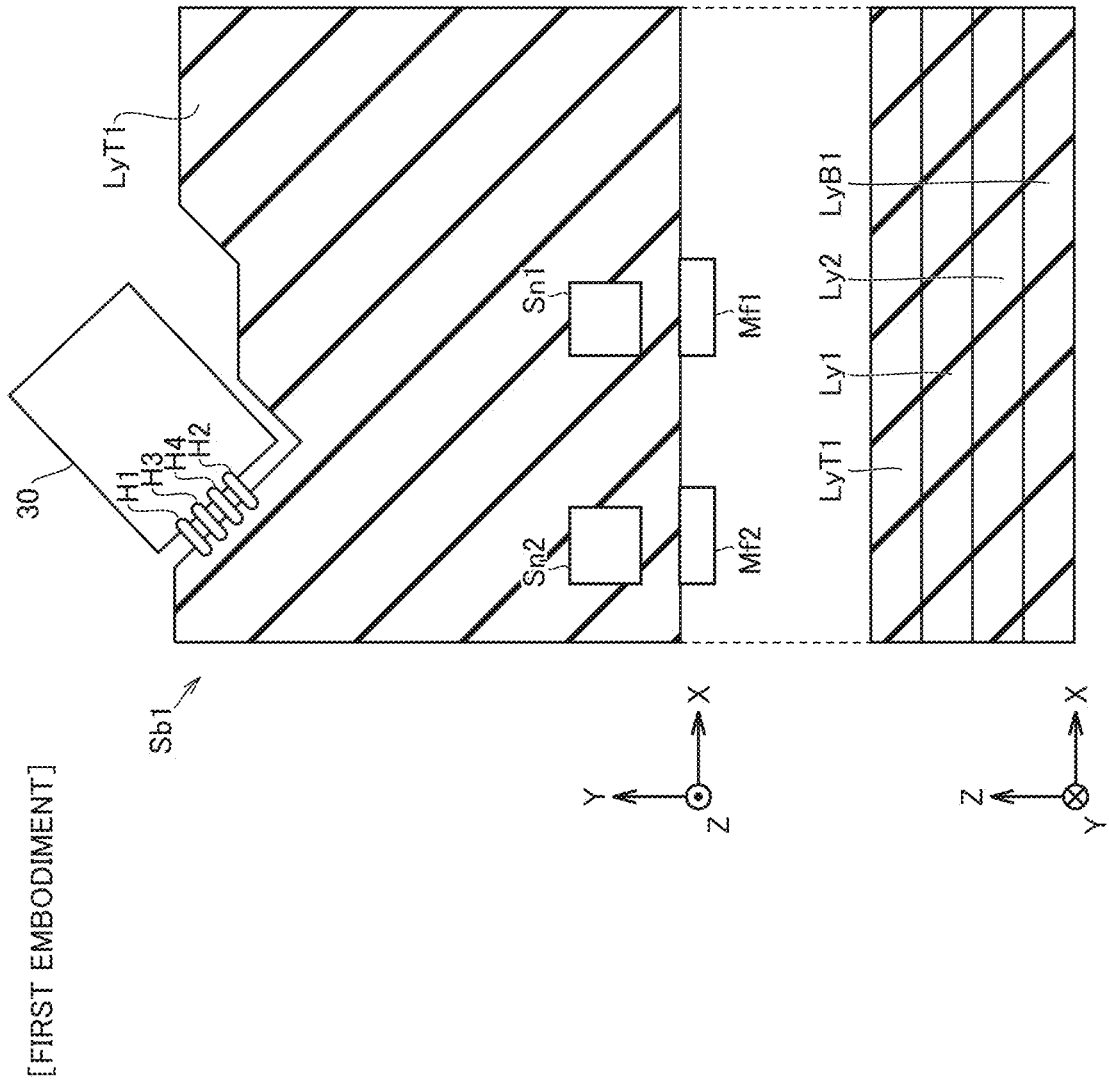
FIG. 3 is a plan view of a printed board in the first embodiment.

FIG. 3 is a plan view of printed board Sb1 in the first embodiment. Printed board Sb1 is a substrate including a plurality of layers layered in a Z-axis direction. In the description below, a direction of normal to printed board Sb1 is defined as the Z-axis direction and a plane perpendicular to the Z-axis direction is defined as an X axis and a Y axis.

A positive direction along a Z axis in each figure may be referred to as an upper side and a negative direction may be referred to as a lower side. The Z-axis direction may correspond to the "stacked direction" in the present disclosure.

In the present embodiment, printed board Sb1 includes four layers LyT1, Ly1, Ly2, and LyB1. Layer LyT1 is a layer exposed on a side of the positive direction along the Z axis and it is an outermost surface of printed Sb1. FIG. 3 shows in an upper portion, a diagram when layer LyT1 is viewed from the side of the positive direction along the Z axis. FIG. 3 shows in a lower portion, a cross-sectional view of four layers LyT1, Ly1, Ly2, and LyB1. As shown in the lower portion in FIG. 3, the layers are arranged in the order of layers LyT1, Ly1, Ly2, and LyB1 from the side of the positive direction along the Z axis. Each layer has a thickness in the Z-axis direction, for example, of 1.1 mm. The thickness of 1.1 mm is merely by way of example, and each layer may have a thickness in the Z-axis direction other than 1.1 mm, and the layers may be different in thickness from one another. Furthermore, the number of layers included in printed board Sb1 is not limited to four, and may be set to two, six, or the like.

Referring to the upper portion in FIG. 3, transformer 30 is arranged on the side of the positive direction along the Y axis of printed board Sb1. Ends H1 and H3 of primary winding Tr11 and ends H2 and H4 of primary winding Tr12 are connected to printed board Sb1. On the side of the negative direction along the Y axis of printed board Sb1, switching elements Mf1 and Mf2 are arranged.

On the side of the positive direction along the Z axis in layer LyT1 of printed board Sb1, snubber circuits Sn1 and Sn2 are mounted. Printed board Sb1 contains a conductive wiring pattern, and this wiring pattern electrically connects transformer 30 and switching element Mf1 and Mf2 to each other.

Figure 4:
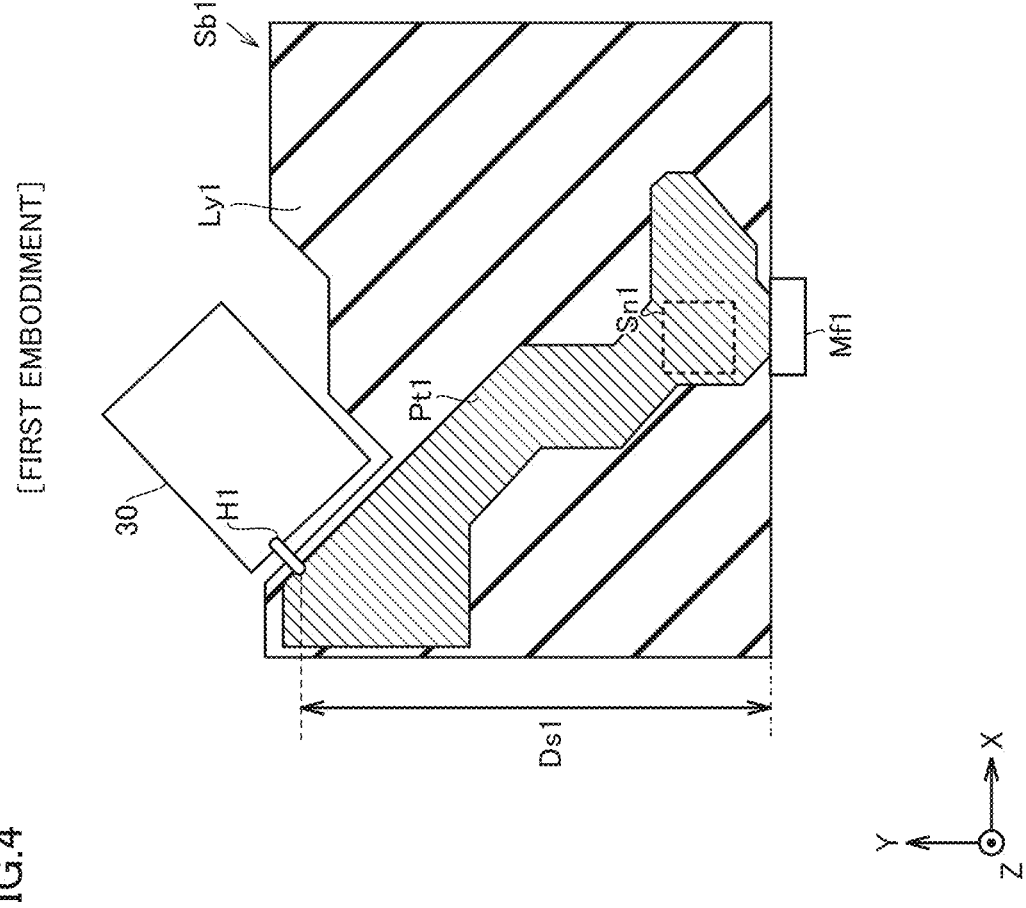
FIG. 4 is a plan view of a layer Ly1 included in the printed board in the first embodiment.

Layers Ly1 and Ly2 arranged on the side of the negative direction along the Z axis relative to layer LyT1 will be described below with reference to FIGS. 4 and 5. FIG. 4 is a plan view of layer Ly1 included in printed board Sb1 in the first embodiment. In the present embodiment, layer Ly1 is a layer arranged on the side of the negative direction along the Z axis relative to layer LyT1 and arranged adjacently to layer LyT1. In other words, layer Ly1 is a layer second from the side of the positive direction along the Z axis. Layer Ly1 may correspond to the "first layer" in the present disclosure.

As shown in FIG. 4, path Pt1 is located on layer Ly1 as the wiring pattern. Primary winding Tr11 of transformer 30 and switching element Mf1 are electrically connected to each other through path Pt1. Snubber circuit Sn1 is connected to path Pt1. A length between end H1 of primary winding Tr11 and switching element Mf1 is defined as a length Ds1.

Figure 5:
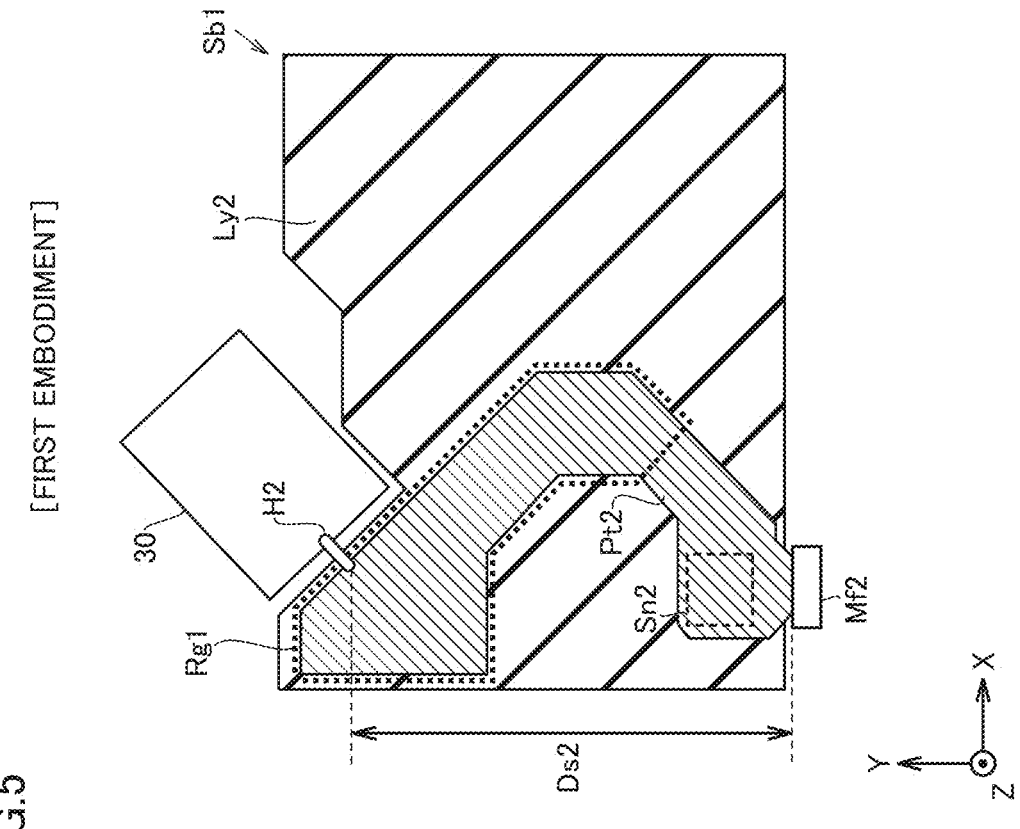
FIG. 5 is a plan view of a layer Ly2 included in the printed board in the first embodiment.

FIG. 5 is a plan view of layer Ly2 included in printed board Sb1 in the first embodiment. In the present embodiment, layer Ly2 is a layer arranged on the side of the negative direction along the Z axis relative to layer Ly1. Layer Ly2 is adjacent to layer Ly1 in the stacked direction. In other words, layer Ly2 is a layer third from the side of the positive direction along the Z axis. Layer Ly2 may correspond to the "second layer" in the present disclosure.

As shown in FIG. 5, path Pt2 is located on layer Ly2 as the wiring pattern. Primary winding Tr12 of transformer 30 and switching element Mf2 are electrically connected to each other through path Pt2. Snubber circuit Sn2 is connected to path Pt2. A length between end H2 of primary winding Tr12 and switching element Mf2 is defined as a length Ds2.

In the present embodiment, a region Rg1 shown in FIG. 5 is a region where path Pt2 and path Pt1 are superimposed on each other when path Pt2 and path Pt1 are viewed from the side of the positive direction along the Z axis. Path Pt1 and path Pt2 are both in a shape shown as region Rg1. In other words, path Pt1 is configured to at least partly be superimposed on path Pt2 when printed board Sb1 is viewed in a plan view. In the region shown as region Rg1, a degree of coupling in magnetic field coupling between path Pt1 and path Pt2 is improved. A mutual inductance between primary winding Tr11 and primary winding Tr12 is thus improved.

The mutual inductance between primary winding Tr11 and primary winding Tr12 is improved, that is, the leakage inductance between primary windings Tr11 and Tr12 is reduced, so that the loop inductance which is a factor for production of the turn-off surge voltage is reduced. Consequently, X-ray fluorescence spectrometer 1000 in the present embodiment can achieve reduction in turn-off surge voltage while the distance between the switching element and the primary winding of the transformer is maintained. Length Ds1 is, for example, 51 mm. Length Ds2 is, for example, 43 mm.

In the present embodiment, with respect to length Ds1 of 51 mm, path Pt1 has a pattern width (a length in an X-axis direction), for example, between 7 mm and 10 mm. With respect to length Ds2 of 43 mm, path Pt2 has a pattern width, for example, between 7 mm and 10 mm. Lengths Ds1 and Ds2 and the pattern widths of paths Pt1 and Pt2 are by way of example and may have other magnitude.

Comparative Example

Figure 6:
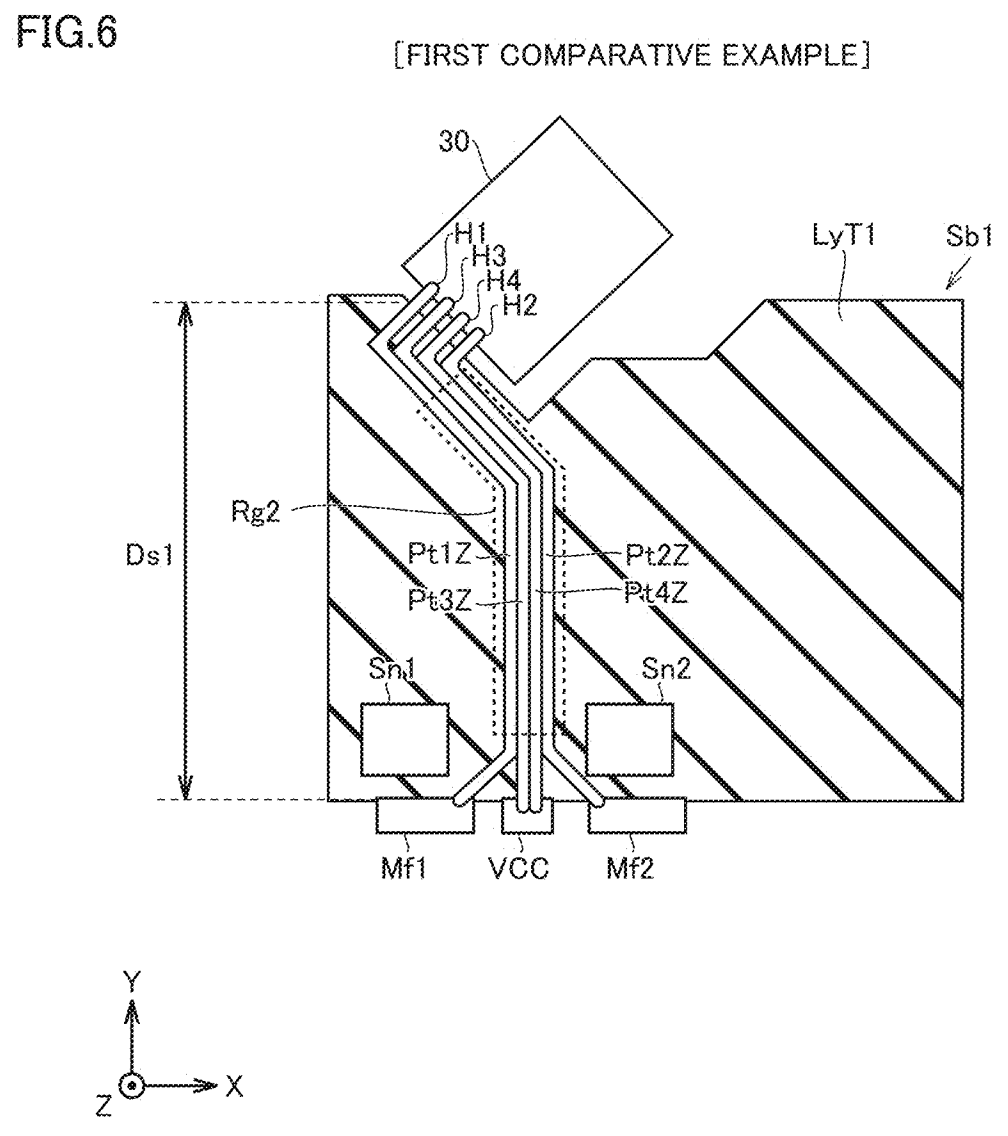

Comparative examples will be described below with reference to FIGS. 6 and 7. FIG. 6 is a plan view for illustrating paths Pt1Z and Pt2Z in a first comparative example. In the comparative examples below, an example where paths Pt1 and Pt2 in the present embodiment are located as paths Pt1Z and Pt2Z implemented by cables rather than the wiring patterns in printed board Sb1 will be described.

In the example in FIG. 6, switching element Mf1 and primary winding Tr11 are connected to each other through path Pt1Z. Path Pt1Z is a cable arranged on the side of the positive direction along the Z axis of printed board Sb1. Similarly, switching element Mf2 and primary winding Tr12 are connected to each other through path Pt2Z. Path Pt2Z is also a cable arranged on the side of the positive direction along the Z axis of printed board Sb1. FIG. 6 shows a path Pt3Z through which supply voltage VCC and primary winding Tr11 are connected to each other and a path Pt4Z through which supply voltage VCC and primary winding Tr12 are connected to each other. Paths Pt3Z and Pt4Z are cables arranged on the side of the positive direction along the Z axis of printed board Sb1, similarly to paths Pt1Z and Pt2Z.

In a region Rg2 shown in FIG. 6, paths Pt1Z to Pt4Z are twisted together. As paths Pt1Z to Pt4Z which are the cables are twisted together, the degree of coupling between path Pt1Z and path Pt2Z is higher than in an example where paths Pt1Z to Pt4Z are wired without being twisted together. In the comparative examples, initially, path Pt1Z and path Pt3Z are twisted together, and path Pt2Z and path Pt4Z are twisted together. Thereafter, twisted path Pt1Z and path Pt3Z and twisted path Pt2Z and path Pt4Z are further twisted together. In a comparative example in one aspect, the order of twisting may be different.

Even when paths Pt1Z to Pt4Z which are the cables are twisted together as in FIG. 6, however, there is a space between the cables or there is an insulating cover for the cable. In the comparative examples, an area per unit length where paths are adjacent to each other is smaller than an area per unit length where paths are adjacent to each other in the first embodiment, and in the comparative examples, the leakage inductance is higher. Therefore, the degree of coupling between path Pt1Z and path Pt2Z in the first comparative example is lower than the degree of coupling between path Pt1 and path Pt2 superimposed on each other as the wiring patterns as shown in the present embodiment. Therefore, in the first comparative example, the length between switching element Mf1 and end H1 of primary winding Tr11 is Ds1 which is the same as in the present embodiment, however, coupling between path Pt1Z and path Pt2Z is weaker than in the present embodiment, and hence the produced turn-off surge voltage is higher.

Figure 7:
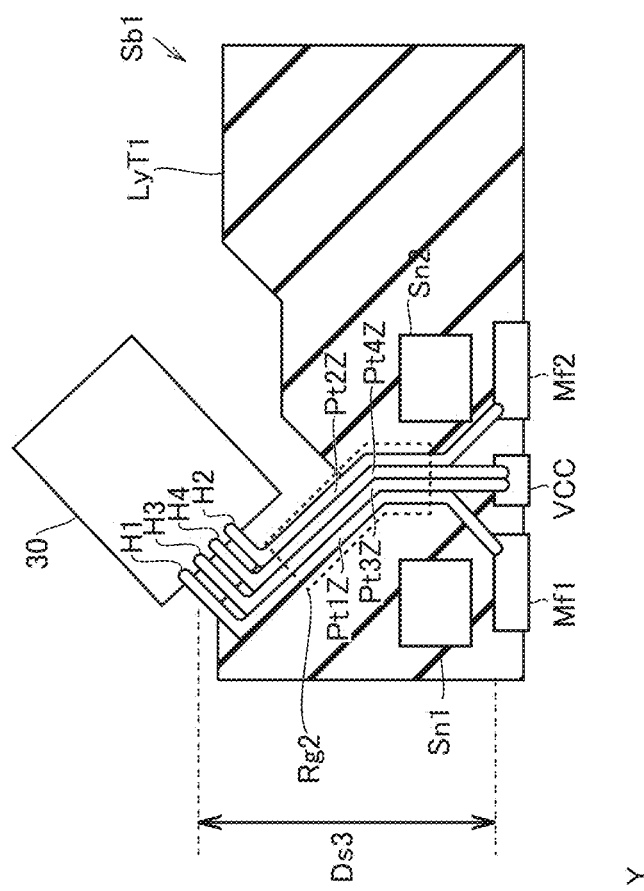
FIG. 7 is a plan view for illustrating a path in a second comparative example.
Figure 7:
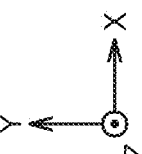

FIG. 7 is a plan view for illustrating paths Pt1Z and Pt2Z in a second comparative example. In the example in FIG. 7, paths Pt1Z and Pt2Z are located as the cables as in the example in FIG. 6. In the example in FIG. 7, a length between end H1 of primary winding Tr11 and switching element Mf1 is defined as a length Ds3. Length Ds3 is shorter than length Ds1 in the present embodiment.

As described with reference to FIG. 6, in the example where paths Pt1Z to Pt4Z are implemented as the cables, the mutual inductance between primary winding Tr11 and primary winding Tr12 becomes lower and the leakage inductance between primary windings Tr11 and Tr12 becomes higher than in the present embodiment. In the example in FIG. 7, lengths themselves of paths Pt1Z to Pt4Z are made shorter to suppress increase in inductance component of paths Pt1Z and Pt2Z.

In the second comparative example, however, the distance between transformer and switching element Mf1 becomes shorter and heat generating elements are densely arranged. Snubber circuits Sn1 and Sn2 are also heat generating elements similarly to transformer 30 and switching element Mf1. Snubber circuits Sn1 and Sn2 are arranged in the vicinity of transformer 30 and switching elements Mf1 and Mf2. In the comparative examples, since the distance between transformer 30 and switching element Mf1 is short, the distance among transformer 30, switching elements Mf1 and Mf2, and snubber circuits Sn1 and Sn2 becomes shorter and the plurality of heat generating elements are densely arranged.

With dense arrangement of the heat generating elements, interaction thereamong may lead to excessive increase in temperature of high-voltage power supply unit 120. In the present embodiment, paths Pt1 and Pt2 are implemented by the wiring patterns on printed board Sb1. Therefore, while increase in inductance component of paths Pt1 and Pt2 is suppressed, sufficient length Ds1 can be secured.

Switching elements Mf1 and Mf2 may also be protected against the turn-off surge voltage by increase in capacity of capacitors included in snubber circuits Sn1 and Sn2 in a further comparative example. Increase in capacity of the capacitor, however, will lead to increase in electric power consumed in snubber circuits Sn1 and Sn2 and greater heat generation in snubber circuits Sn1 and Sn2. Since paths Pt1 and Pt2 are implemented by the wiring patterns on printed board Sb1 in the present embodiment, resistance of snubber circuits Sn1 and Sn2 and a constant of the capacitor can be reduced and electric power consumed in snubber circuits Sn1 and Sn2 can be reduced.

Second Embodiment

In the first embodiment, an example in which a single transformer 30 is connected to printed board Sb1 is described. In a second embodiment, a configuration in which a transformer 30A is connected to printed board Sb1 in addition to transformer 30 will be described. Description of features the same as those in X-ray fluorescence spectrometer 1000 in the first embodiment will not be repeated in the second embodiment.

Figure 8:
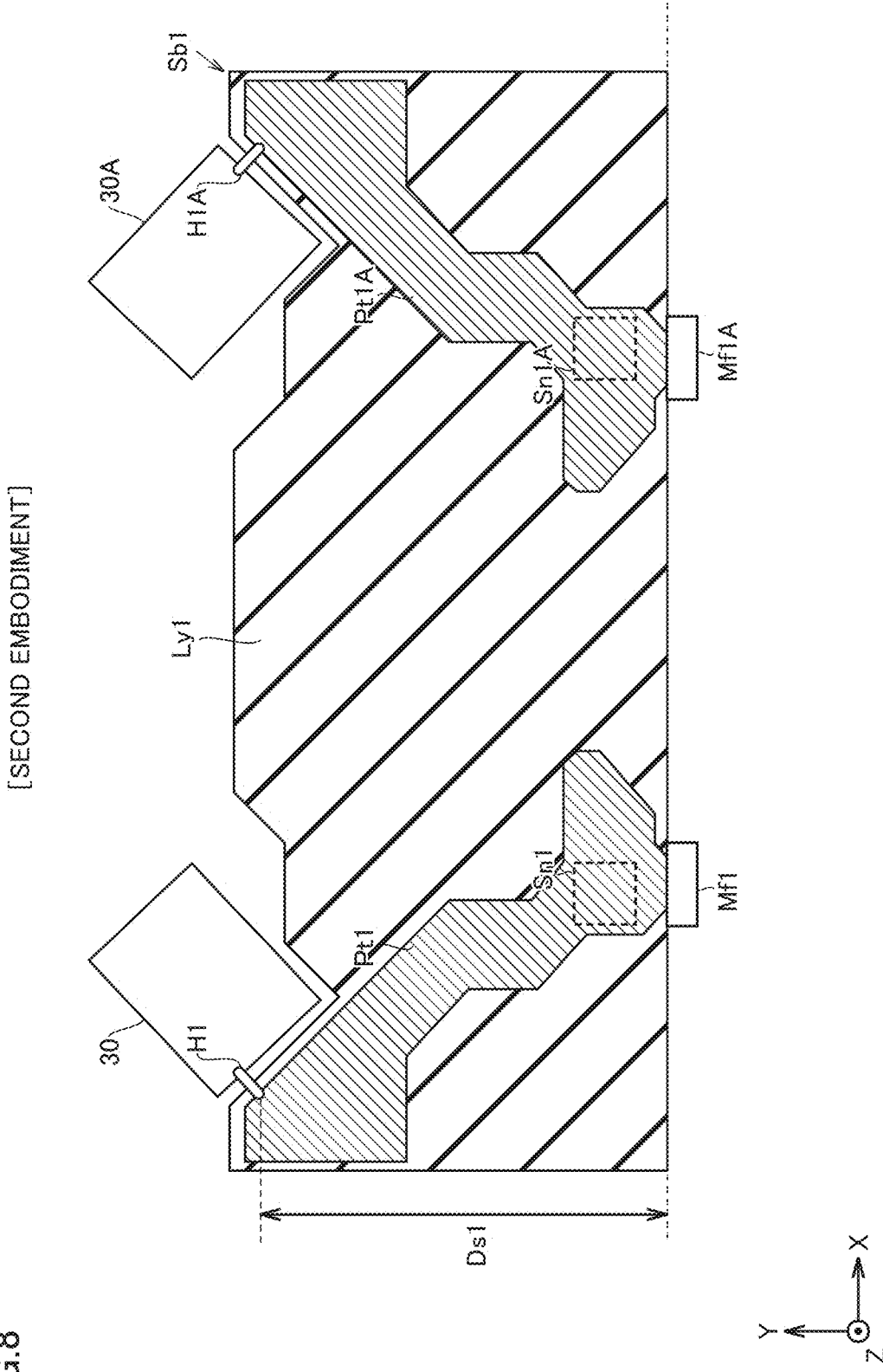
FIG. 8 is a plan view of layer Ly1 included in a printed board in a second embodiment.

FIG. 8 is a plan view of layer Ly1 included in printed board Sb1 in the second embodiment. In the second embodiment, transformer 30A is connected to printed board Sb1 in addition to transformer 30. A switching element Mf1A is connected to printed board Sb1 in addition to switching element Mf1. In other words, the second embodiment includes the features shown in FIG. 2, two for each kind.

As shown in FIG. 8, a path Pt1A in addition to path Pt1 is located on layer Ly1 as the wiring pattern. A primary winding of transformer 30A and switching element Mf1A are electrically connected to each other through path Pt1A. In other words, X-ray fluorescence spectrometer 1000 in the second embodiment includes two transformer primary-side circuits 401.

In the second embodiment, transformer 30 may correspond to the "first transformer" in the present disclosure. In the second embodiment, transformer 30A may correspond to the "second transformer" in the present disclosure. In the second embodiment, path Pt1 may correspond to the "first wiring pattern of the first transformer" in the present disclosure. In the second embodiment, path Pt1A may correspond to the "first wiring pattern of the second transformer" in the present disclosure.

Figure 9:
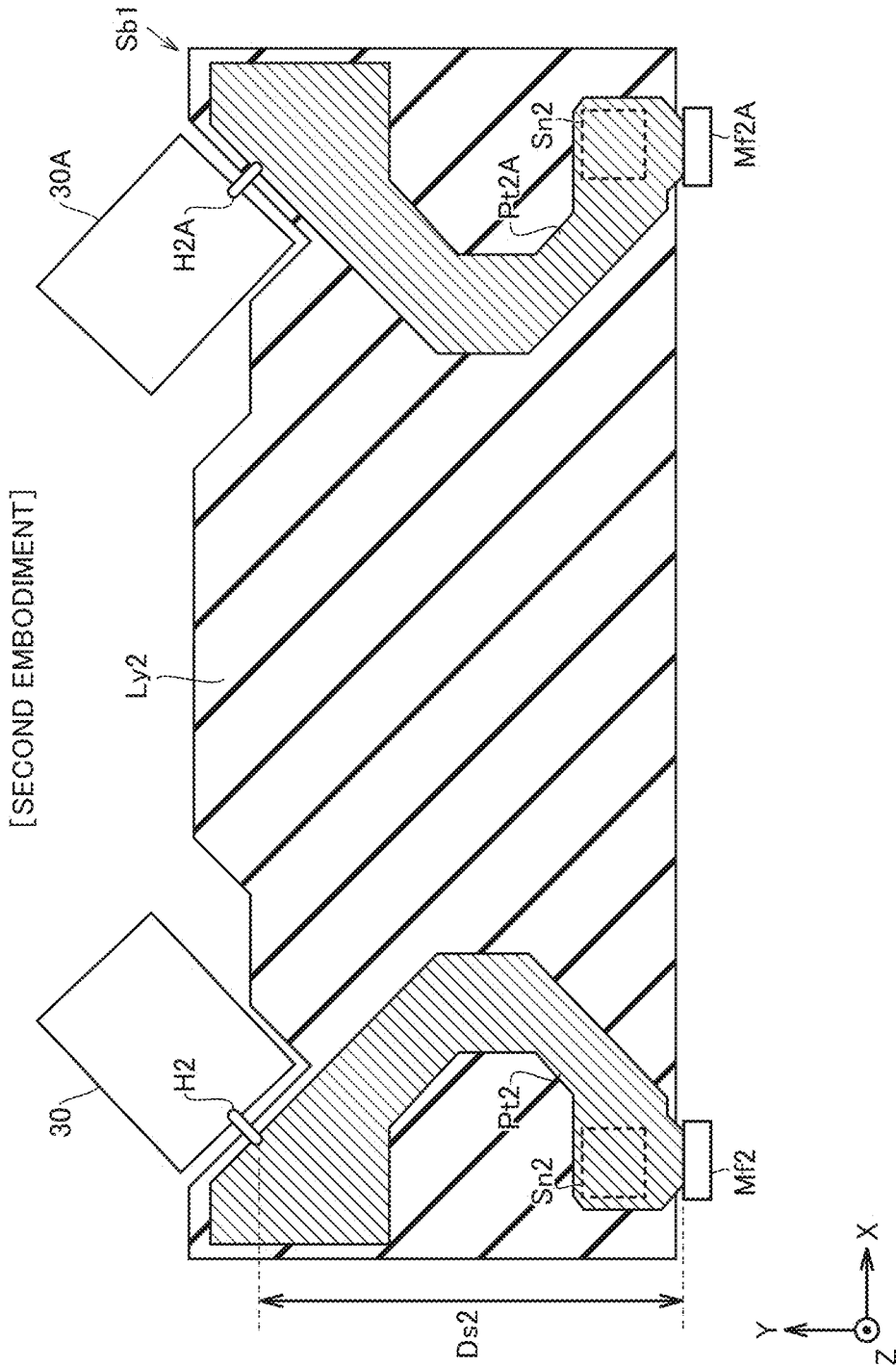
FIG. 9 is a plan view of layer Ly2 included in the printed board in the second embodiment.

FIG. 9 is a plan view of layer Ly2 included in printed board Sb1 in the second embodiment. As shown in FIG. 9, a path Pt2A in addition to path Pt2 is located on layer Ly2 as the wiring pattern. A primary winding of transformer 30A and a switching element Mf2A are electrically connected to each other through path Pt2A. A snubber circuit Sn2A is connected to path Pt2A.

X-ray fluorescence spectrometer 1000 in the second embodiment thus includes two transformers. In the second embodiment, path Pt1 connected to transformer 30 and path Pt1A connected to transformer 30A are located on the same layer Ly1. In the second embodiment, path Pt2 connected to transformer 30 and path Pt2A connected to transformer 30A are located on the same layer Ly2. A circuit connected to transformer 30 and a circuit connected to transformer 30A are desirably identical in configuration and characteristic they have. In the second embodiment, path Pt2 may correspond to the "second wiring pattern of the first transformer" in the present disclosure. In the second embodiment, path Pt2A may correspond to the "second wiring pattern of the second transformer" in the present disclosure.

Modification

In the present embodiment, layer Ly1 and layer Ly2 are layers adjacent to each other. In one aspect, however, another layer may be arranged between layer Ly1 and layer Ly2. Though length Ds1 and length Ds2 are different from each other in the present embodiment, they may be the same.

Shapes of path Pt1 and path Pt2 are not limited to the shapes shown in FIGS. 4 and 5 but may be otherwise.

Furthermore, in the present embodiment, an example in which switching elements Mf1 and Mf2 are arranged at positions different in the X-axis direction as shown in FIG. 3 is described. Switching element Mf1, however, may be arranged at a position different in the Z-axis direction or the Y-axis direction.

In the second embodiment, path Pt1 and path Pt1A may be located on different layers and path Pt2 and path Pt2A may be located on different layers. For example, in an example where printed board Sb1 is located from at least four layers including first to fourth layers, path Pt1 may be arranged on the first layer, path Pt2 may be arranged on the second layer, path Pt1A may be arranged on the third layer, and path Pt2A may be arranged on the fourth layer.

[Aspects]

Illustrative embodiments described above are understood by a person skilled in the art as specific examples of aspects below.

(Clause 1) An X-ray fluorescence spectrometer (1000) according to one aspect includes an X-ray tube (200) including a filament (F1) and a target (Tg1), the X-ray tube (200) being configured to irradiate a sample(S) with primary X-rays (10), a detector (300) that detects secondary X-rays (20) generated from the sample, and a power supply (120) that applies a tube voltage to the target. The power supply includes a transformer (30), a switching circuit (Mf1, Mf2) connected to a primary side of the transformer, and a substrate (Sb1) to which the switching circuit and the transformer are connected, the substrate including a first layer (Ly1) and a second layer (Ly2). The transformer includes a first primary winding (Tr11) and a second primary winding (Tr12) on the primary side. A first wiring pattern (Pt1) that connects the first primary winding and the switching circuit to each other is located in the first layer. A second wiring pattern (Pt2) that connects the second primary winding and the switching circuit to each other is located in the second layer. The first layer and the second layer are arranged such that at least a part of the first wiring pattern overlaps with the second wiring pattern when the substrate is viewed from a stacked direction (Z-axis direction) in a plan view.

According to X-ray fluorescence spectrometer 1000 described in Clause 1, while the distance between the switching element and the primary winding of the transformer is maintained, the turn-off surge voltage is reduced.

(Clause 2) In the X-ray fluorescence spectrometer (1000) described in Clause 1, the first layer is a layer adjacent to the second layer in the stacked direction.

According to X-ray fluorescence spectrometer 1000 described in Clause 2, the degree of coupling between path Pt1 and path Pt2 can be improved.

(Clause 3) In the X-ray fluorescence spectrometer (1000) described in Clause 1 or 2, the switching circuit includes a first switching element (Mf1) connected to the first primary winding through the first wiring pattern (Pt1) and a second switching element (Mf2) connected to the second primary winding through the second wiring pattern (Pt2).

According to X-ray fluorescence spectrometer 1000 described in Clause 3, the plurality of switching elements can be used to supply electric power to transformer 30.

(Clause 4) In the X-ray fluorescence spectrometer (1000) described in Clause 3, the power supply further includes a first snubber circuit (Sn1) connected to the first primary winding and the first switching element and a second snubber circuit (Sn2) connected to the second primary winding and the second switching element.

According to X-ray fluorescence spectrometer 1000 described in Clause 4, dense arrangement of heat generating elements including the snubber circuit can be suppressed.

(Clause 5) In the X-ray fluorescence spectrometer (1000) described in any one of Clauses 1 to 4, the transformer includes a first transformer (30) and a second transformer (30A), the first wiring pattern (Pt1) in the first transformer (30) and the first wiring pattern (Pt1A) in the second transformer (30A) are located in a same first layer, and the second wiring pattern (Pt2) in the first transformer (30) and the second wiring pattern (Pt2A) in the second transformer (30A) are located in a same second layer.

According to X-ray fluorescence spectrometer 1000 described in Clause 5, since the wiring patterns can be located in the same layer in the configuration including the plurality of transformers, characteristics of transformer primary-side circuit 401 shown in FIG. 2 can be almost the same between two channels for respective transformers.

(Clause 6) A power supply apparatus (100) according to one aspect is a power supply apparatus (120) that applies a tube voltage to a target (Tg1) arranged in an X-ray tube (200), and the power supply apparatus includes a transformer (30), a switching circuit (Mf1, Mf2) connected to a primary side of the transformer, and a substrate (Sb1) to which the switching circuit and the transformer are connected, the substrate including a first layer (Ly1) and a second layer (Ly2). The transformer includes a first primary winding (Tr11) and a second primary winding (Tr12) on the primary side. A first wiring pattern (Pt1) that connects the first primary winding and the switching circuit to each other is located in the first layer. A second wiring pattern (Pt2) that connects the second primary winding and the switching circuit to each other is located in the second layer. The first layer and the second layer are arranged such that at least a part of the first wiring pattern overlaps with the second wiring pattern when the substrate is viewed from a stacked direction (Z-axis direction) in a plan view.

According to the power supply apparatus described in Clause 6, while the distance between the switching element and the primary winding of the transformer is maintained, the turn-off surge voltage is reduced.

Though embodiments of the present invention have been described, it should be understood that the embodiments disclosed herein are illustrative and non-restrictive in every respect. The scope of the present invention is defined by the terms of the claims and is intended to include any modifications within the scope and meaning equivalent to the terms of the claims.

What is claimed is:

1. An X-ray fluorescence spectrometer comprising:

an X-ray tube including a filament and a target, the X-ray tube being configured to irradiate a sample with primary X-rays;

a detector that detects secondary X-rays generated from the sample; and a power supply that applies a tube voltage to the target, wherein the power supply includes a transformer, a switching circuit connected to a primary side of the transformer, and a substrate to which the switching circuit and the transformer are connected, the substrate including a first layer and a second layer, the transformer includes a first primary winding and a second primary winding on the primary side, a first wiring pattern that connects the first primary winding and the switching circuit to each other is located in the first layer, a second wiring pattern that connects the second primary winding and the switching circuit to each other is located in the second layer, and the first layer and the second layer are arranged such that at least a part of the first wiring pattern overlaps with the second wiring pattern when the substrate is viewed from a stacked direction in a plan view.

2. The X-ray fluorescence spectrometer according to claim 1, wherein the first layer is a layer adjacent to the second layer in the stacked direction.

3. The X-ray fluorescence spectrometer according to claim 1, wherein the switching circuit includes a first switching element connected to the first primary winding through the first wiring pattern, and a second switching element connected to the second primary winding through the second wiring pattern.

4. The X-ray fluorescence spectrometer according to claim 3, wherein the power supply further includes a first snubber circuit connected to the first primary winding and the first switching element, and a second snubber circuit connected to the second primary winding and the second switching element.

5. The X-ray fluorescence spectrometer according to claim 1, wherein the transformer includes a first transformer and a second transformer, the first wiring pattern in the first transformer and the first wiring pattern in the second transformer are located in a same first layer, and the second wiring pattern in the first transformer and the second wiring pattern in the second transformer are located in a same second layer.

6. A power supply apparatus that applies a tube voltage to a target arranged in an X-ray tube, the power supply apparatus comprising:

a transformer;

a switching circuit connected to a primary side of the transformer; and a substrate to which the switching circuit and the transformer are connected, the substrate including a first layer and a second layer, wherein the transformer includes a first primary winding and a second primary winding on the primary side, a first wiring pattern that connects the first primary winding and the switching circuit to each other is located in the first layer, a second wiring pattern that connects the second primary winding and the switching circuit to each other is located in the second layer, and the first layer and the second layer are arranged such that at least a part of the first wiring pattern overlaps with the second wiring pattern when the substrate is viewed from a stacked direction in a plan view.

* * * * *